United States Patent [19]
Ueda et al.

[11] Patent Number: 5,365,772
[45] Date of Patent: Nov. 22, 1994

[54] LEAK DETECTION IN A REDUCED PRESSURE PROCESSING APPARATUS

[75] Inventors: Yasuhiro Ueda, Tokyo; Hironari Takahashi, Itami, both of Japan

[73] Assignees: Tokyo Electron Limited; Mitsubishi Electric Corporation, both of Tokyo, Japan

[21] Appl. No.: 87,859

[22] Filed: Jul. 9, 1993

[30] Foreign Application Priority Data

Jul. 10, 1992 [JP] Japan .................. 4-206249

[51] Int. Cl.$^5$ .......................................... G01M 3/04
[52] U.S. Cl. ...................... 73/40.7; 118/715; 118/720; 118/725; 204/298.03; 204/298.07; 117/86
[58] Field of Search ............... 73/40.7; 118/715, 720, 118/725; 156/612; 204/298.03, 298.07

[56] References Cited

U.S. PATENT DOCUMENTS

| | | | |
|---|---|---|---|
| 4,492,110 | 1/1985 | Bergquist | 73/40.7 |
| 4,773,276 | 9/1988 | Saulgeot | 73/40.7 |
| 4,776,207 | 10/1988 | Holme | 73/40.7 |
| 4,779,449 | 10/1988 | Bley et al. | 73/40.7 |
| 4,793,283 | 12/1988 | Sarkozy | 118/725 |
| 5,199,994 | 4/1993 | Aoki | 118/715 |

OTHER PUBLICATIONS

J. W. Coburn "Plasma etching and reactive ion etching" AVS monograph series, American vacuum society 1982, pp. 13–17.

*Primary Examiner*—R. Bruce Breneman
*Assistant Examiner*—Ramamohan Rao Paladugu
*Attorney, Agent, or Firm*—Oblon, Spivak, McClelland, Maier & Neustadt

[57] ABSTRACT

A reduced pressure processing apparatus includes a processing vessel for performing predetermined processing to an object to be processed in a reduced pressure atmosphere, an exhaust mechanism, including a main exhaust system having a relatively high exhaust pressure and a sub-exhaust system having a relatively low exhaust pressure, for evacuating the processing vessel, and an oxygen gas concentration sensor for detecting an oxygen gas concentration in the processing vessel during exhaust performed by the sub-exhaust system. The oxygen gas concentration in the processing vessel is detected while the processing vessel is evacuated with a relatively low exhaust pressure. It is determined whether leakage is present or absent by confirming a detection value is a predetermined value or less within a predetermined period of time. When leakage is absent, the processing vessel is evacuated with the relatively high exhaust pressure. When leakage is present, the exhaust is interrupted, and necessary processing is performed. When the processing vessel is set in a desired reduced pressure state, predetermined processing is performed to the substrate.

15 Claims, 4 Drawing Sheets

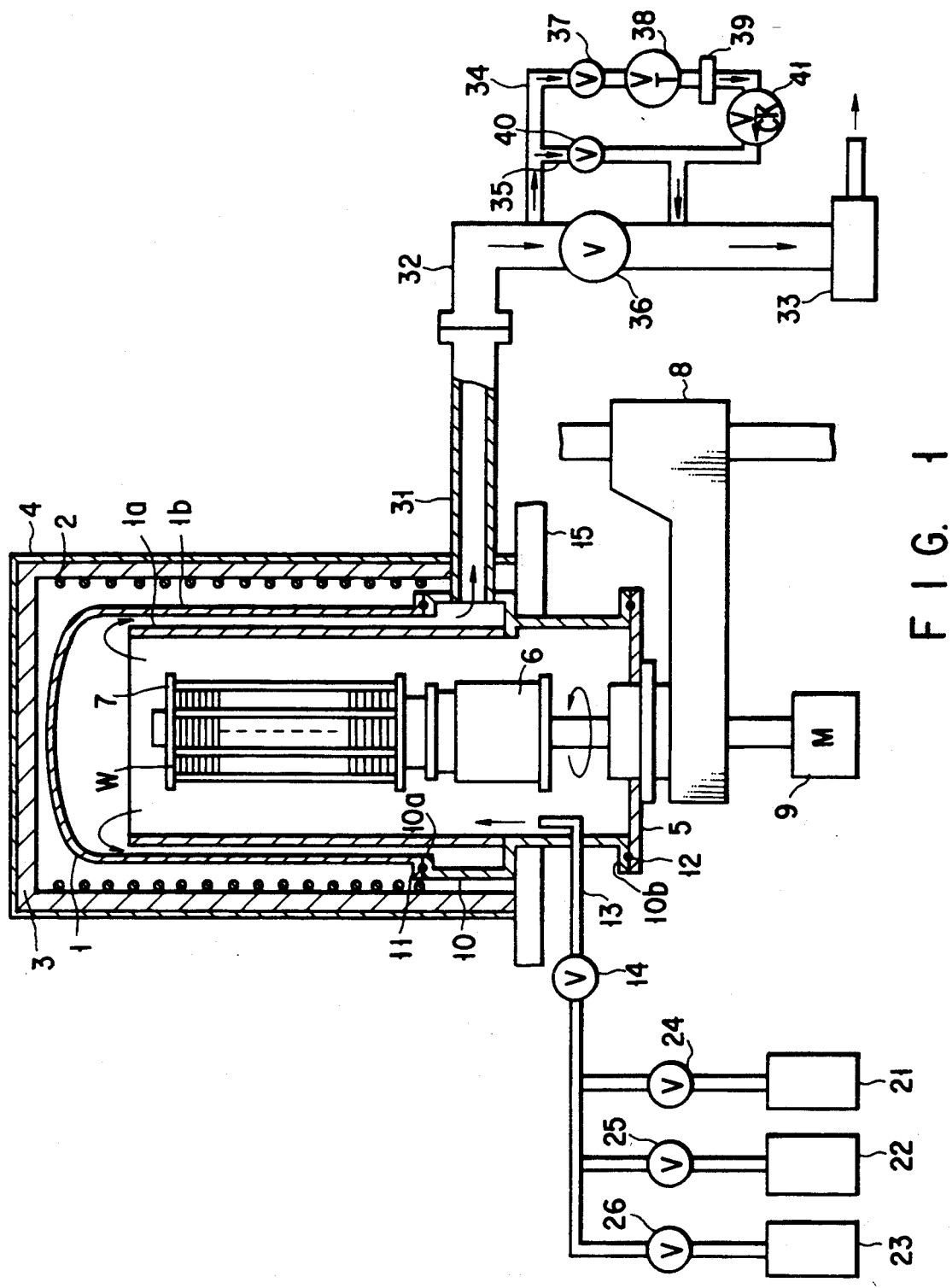
F I G. 1

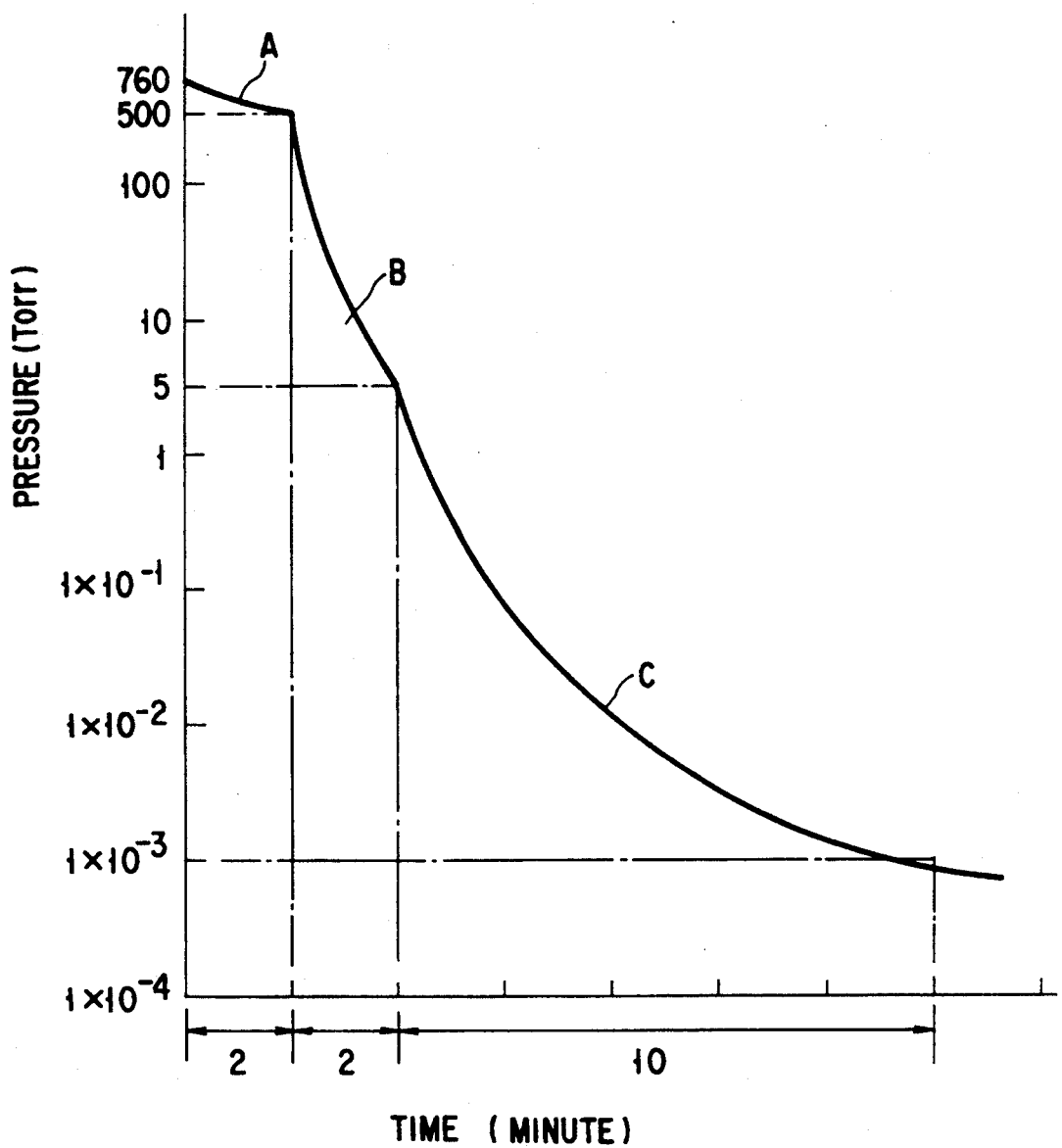
F I G. 2

LEAK DETECTION IN A REDUCED PRESSURE PROCESSING APPARATUS

BACKGROUND OF THE INVENTION

1. Field of the Invention

The present invention relates to a reduced pressure processing apparatus and a method therefor, which are used in reduced pressure processing such as CVD processing for a semiconductor wafer.

2. Description of the Related Art

In the manufacture of a semiconductor device, appropriate processing such as CVD is performed to a semiconductor wafer. In low-pressure CVD processing, for example, evacuation is performed to change a pressure in a processing vessel purged with a nitrogen gas from an atmospheric pressure to a reduced pressure while the processing vessel is heated. In this case, when the processing vessel is rapidly evacuated with a high exhaust pressure from the beginning, the wafer is contaminated with particles raised in the processing vessel. For this reason, a main exhaust system having a high exhaust pressure and a sub-exhaust system having a low exhaust pressure are arranged. During evacuation, the processing vessel is slowly evacuated by using the sub-exhaust system with the low exhaust pressure first, and then the processing vessel is rapidly evacuated by using the main exhaust system with the high exhaust pressure.

Although an O-ring is used to air-tightly seal the processing vessel, the elastic deformation of the O-ring easily becomes insufficient due to its heat deterioration over time. For this reason, to evacuate the processing vessel with the low exhaust pressure, a force for pressing the O-ring is so weak that the O-ring cannot be brought into tight contact with a sealed portion. As a result, a gap may be formed around the O-ring.

As described above, when the processing vessel purged with a nitrogen gas is evacuated with a low exhaust pressure while the gap is formed around the O-ring, external air is drawn from the gap to result in entrance of an oxygen gas into the processing vessel. In this manner, when low-pressure CVD processing is performed while the oxygen gas is present in the processing vessel, an unnecessary spontaneous oxide film is formed on the surface of a silicon semiconductor wafer.

However, even when the oxygen gas is drawn into the processing vessel as described above, after the evacuation is performed by the sub-exhaust system, evacuation of the processing vessel with the high exhaust pressure may cause deformation of the O-ring by a shock to seal the openings around the O-ring. In this case, since there is no leakage any more, even when the pressure in the processing vessel to be tested is measured to determine whether leakage is present or absent, "no leakage" is obtained. That is, any leakage which has occurred in the evacuation using the sub-exhaust system with the low exhaust pressure cannot be detected.

As described above, in the conventional technique, even when an oxygen gas is drawn into the main exhaust system, this cannot be detected. For this reason, prior to the low-pressure CVD processing, a spontaneous oxide film having a considerably large volume may be formed on the surface of the silicon semiconductor wafer. Therefore, in this case, a film is to be formed on the spontaneous oxide film by the low-pressure CVD processing, and a production yield is considerably decreased.

SUMMARY OF THE INVENTION

It is, therefore, an object of the present invention to provide a reduced pressure processing apparatus and a method therefor, which are capable of reliably detecting the presence/absence of leakage of a processing vessel set in a reduced pressure state.

According to the first aspect of the present invention, there is provided a reduced pressure processing apparatus comprising: a processing vessel for performing predetermined processing to an object to be processed in a reduced pressure atmosphere; exhaust means, including a main exhaust system having a relatively high exhaust pressure and a sub-exhaust system having a relatively low exhaust pressure, for evacuating the processing vessel; and detection means for detecting an oxygen gas concentration or an oxygen gas partial pressure in the processing vessel during exhaust performed by the sub-exhaust system.

According to the second aspect of the present invention, there is provided a reduced pressure processing method for setting a processing vessel in a reduced pressure atmosphere to process an object to be processed, the method comprising the steps of: evacuating the processing vessel with a relatively low exhaust pressure; detecting an oxygen gas concentration or an oxygen gas partial pressure in the processing vessel during exhaust performed with the low exhaust pressure; determining whether leakage is present or absent by confirming whether a detection value becomes a predetermined value or less within a predetermined period of time; evacuating the processing vessel with a relatively large exhaust pressure when it is determined that leakage is absent; interrupting exhaust to perform required processing when it is determined that leakage is present; and performing predetermined processing to the object in the processing vessel when the processing vessel is set in a desired reduced pressure state.

According to the present invention, the oxygen concentration in the processing vessel is detected by the oxygen gas concentration detection means during the exhaust performed by the sub-exhaust system to confirm whether the oxygen gas concentration becomes not more than a predetermined value within the predetermined period of time. Therefore, when leakage has occurred in the processing vessel, this leakage can be reliably detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view showing a reduced pressure processing apparatus according to the first embodiment of the present invention;

FIG. 2 is a graph showing a change in processing vessel pressure over time during exhaust performed in the apparatus in FIG. 1.

DETAILED DESCRIPTION OF THE PREFERRED EMBODIMENTS

Figure 3:
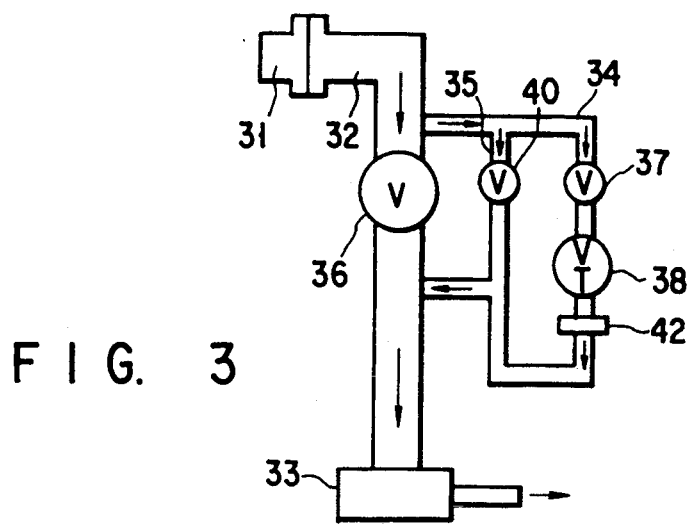
FIGS. 3 to 7 are views showing exhaust systems of reduced pressure processing apparatuses according to other embodiments of the present invention.

Preferable embodiments of the present invention will be described below.

FIG. 1 is a sectional view showing a low-pressure CVD processing apparatus serving as a reduced pressure processing apparatus according to an embodiment of the present invention. As shown in FIG. 1, the low-pressure CVD apparatus comprises a processing vessel 1 formed of a thermal insulating material, e.g., quartz or fused silica, and arranged to keep its longitudinal direction vertical, a heater 2 arranged in the form of a coil around the processing vessel 1, a heat-resistant material 3 arranged to surround the heater 2, and a housing 4 for storing them. When the heater 2 is energized, the interior of the processing vessel 1 is heated to a predetermined temperature.

The processing vessel 1 has a double-tube structure constituted by an inner tube 1a and an outer tube 1b which are coaxially arranged, and the outer tube 1b is supported by a cylindrical manifold 10 arranged below the outer tube 1b. The manifold 10 has a cylindrical shape having a step and upper and lower open ends, and the manifold 10 consists of, e.g., stainless steel. The manifold 10 has flanges 10a and 10b at its upper and lower ends, and has a step portion 10c at its central portion in the circumferential direction. The step portion 10c of the manifold 10 is fixed on a base 15. The lower opening of the manifold 10 is sealed with a lid-like support member 5. A heat insulating cylinder 6 is supported on the lid-like support member 5, and a wafer boat 7 in which a plurality of wafers W serving as objects to be processed are arranged is placed on the heat insulating cylinder 6 to keep the surfaces of the wafers horizontal.

The lid-like support member 5 is vertically moved by an elevator 8 to load/unload the wafer boat 7 into/from the processing vessel 1.

FIG. 1 shows a state wherein the semiconductor wafers W are loaded in the processing vessel 1. The support member 5 functions as a lid, thereby keeping the processing vessel 1 in an air-tight state. O-ring seals 11 and 12 are interposed between the outer tube 1b of the processing vessel 1 and the upper flange 10a of the manifold 10 and between the lid-like support member 5 and the lower flange 10b of the manifold 10 so as to air-tightly seal the portions therebetween. As the O-ring seals 11 and 12, e.g., Biton (tradename) can be used.

The heat insulating cylinder 6 and the wafer boat 7 in which the wafers W are placed can be rotated with a motor 9.

A gas supply pipe 13 consisting of, e.g., quartz, is connected to a lower portion of the side wall of the manifold 10 so as to be bent upward toward a processing region in the processing vessel 1. The gas supply pipe 13 is connected to a purge gas supply source 23 and process gas supply sources 21 and 22 for respectively supplying, e.g., a silane ($SiH_4$) gas and a phosphine ($PH_3$) gas serving as process gases. The process gases from the process gas supply sources 21 and 22 are supplied into the processing vessel 1 through the gas supply pipe 13. In addition, a purge gas, e.g., an $N_2$ gas or an $H_2$ gas is supplied from the purge gas supply source 23 into the processing vessel 1 through the gas supply pipe 13.

A valve 14 is arranged in the gas supply pipe 13 on the processing vessel 1 side. The gas supply pipe 13 is branched midway along the gas supply pipe 13 toward the gas supply sources, and valves 24, 25, and 26 are arranged in correspondence with the gas supply sources 21, 22, and 23.

A gas exhaust tube 31 is connected to an upper portion of the wall of the manifold 10, and a vacuum pump 33 is connected to the gas exhaust tube 31 through a main exhaust pipe 32. A first sub-exhaust pipe 34 and a second sub-exhaust pipe 35 are parallelly connected to the main exhaust pipe 32. The vacuum pump 33 is operated to exhaust a gas flowing downward between the inner tube 1a and the outer tube 1b from the system, such that the interior of the processing vessel 1 can be set in a reduced pressure atmosphere having a predetermined pressure.

A main valve 36 is arranged in the main exhaust pipe 32, and a main exhaust system having a high exhaust pressure is constituted by the main exhaust pipe 32, the main valve 36, and the vacuum pump 33.

A first sub-valve 37, a needle valve 38, and an oxygen gas concentration sensor 39 are inserted in the first sub-exhaust pipe 34, and a second sub-valve 40 is inserted in the second sub-exhaust pipe 35. A sub-exhaust system having a low exhaust pressure is constituted by the first sub-exhaust pipe 34, the second sub-exhaust pipe 35, the first sub-valve 37, the needle valve 38, the oxygen gas concentration sensor 39, the second sub-valve 40, and the vacuum pump 33. Note that the exhaust pressure of the first sub-exhaust pipe 34 can be set to be lower than that of the second sub-exhaust pipe 35 by adjusting the needle valve 38.

The oxygen gas concentration sensor 39 is a sensor of zirconia ceramics type, and the sensor measures an oxygen concentration by using an electro-chemical cell of zirconia ceramics. As the oxygen gas concentration sensor 39, for example, Token TB-11C (tradename) can be used. As the oxygen gas concentration sensor, any other type can be used.

As shown in FIG. 1, the oxygen gas concentration sensor 39 is preferably arranged on the downstream side of the needle valve 38 to prevent a reaction product from being adhered inside the processing vessel 1.

As shown in FIG. 1, a protection valve 41 may be arranged on the downstream side of the oxygen gas concentration sensor 39. The protection valve 41 can prevent the reaction product in the processing vessel 1 from reversely flowing into the first sub-valve 37.

An operation for performing low-pressure CVD processing using the low-pressure CVD apparatus having the above arrangement will be described below with reference to FIG. 2. FIG. 2 is a graph showing a change in pressure in the processing vessel 1 over time in this low-pressure CVD processing.

The boat elevator 8 is moved downward, and the wafer boat 7 on which the plurality of wafers W are placed is placed on the heat insulating cylinder 6. The interior of the processing vessel 1 is heated with the heater 2 to set the temperature in the processing vessel 1 to, e.g., 700° C.

A purge gas, e.g., a nitrogen gas, is supplied from the purge gas supply source 23 connected to the gas supply pipe 13 into the processing vessel 1 to purge the processing vessel 1.

The wafer boat 7 is moved upward with the boat elevator 8 and loaded into the processing vessel 1. At this time, the temperature of the inside of the processing vessel 1 is kept at, e.g., 700° C.

In this state, the first sub-valve 37 of the first sub-exhaust pipe 34 is opened while the main valve 36 of the main exhaust pipe 32 and the first sub-valve 37 of the second sub-exhaust pipe 35 are closed, and the processing vessel 1 is evacuated with a low exhaust pressure while the needle valve 38 is adjusted. During this exhaust, the oxygen gas concentration of a gas supplied from the processing vessel 1 is detected by the oxygen gas concentration sensor 39.

The first sub-valve 37 is open for, e.g., about 2 minutes. At this time, the pressure in the processing vessel 1 is decreased from, e.g., 760 Torr to about 500 Torr. Since the processing vessel 1 is purged with the nitrogen gas in advance to decrease an oxygen gas concentration, the oxygen gas concentration is decreased from, e.g., 0.3% to 0.2%.

Since an exhaust pressure generated by the first sub-exhaust pipe 34 must be low not to raise particles in the processing vessel 1, the exhaust pressure is preferably set to be 8 to 12 l/min.

In the above description, when the oxygen gas concentration is decreased to a predetermined value or less within a predetermined period of time, the second sub-valve 40 is opened, and the processing vessel 1 is evacuated by using the second sub-exhaust pipe 35 with an exhaust pressure which is higher than that of the first sub-exhaust pipe 34 and lower than that of the main exhaust pipe 32.

That is, when the oxygen gas concentration in the processing vessel 1 is the predetermined value or less after the lapse of a predetermined period of time, it is determined that substantially no oxygen gas is drawn by leakage, and the exhaust is continued with a high exhaust pressure to rapidly evacuate the processing vessel 1.

The second sub-valve 40 is open for about 2 minutes as shown in FIG. 2B. At this time, the pressure in the processing vessel 1 is decreased, e.g., from about 500 Torr to about 5 Torr.

Since an exhaust pressure generated by the second sub-exhaust pipe 35 must be higher than that of the first sub-exhaust pipe 34 and must be low enough to prevent particles in the processing vessel 1 from being raised, it is preferably set to be 40 to 60 l/min in a normal state.

When the exhaust performed by the second sub-exhaust pipe 35 is completed, the main valve 36 is opened, and the processing vessel 1 is evacuated by using the main exhaust pipe 32 with an exhaust pressure higher than that of the second sub-exhaust pipe 35.

The main exhaust pipe 32 desirably requires a high exhaust pressure to rapidly perform exhaust, and the exhaust pressure is preferably set to be 8,000 to 12,000 l/min in a normal state.

The pressure in the processing vessel 1 is decreased, e.g., from about 5 Torr to $1 \times 10^{-3}$ Torr within about 10 minutes by the exhaust using the main exhaust pipe 32 (C in FIG. 2).

In this manner, when the exhaust of the processing vessel 1 is completed, the heat insulating cylinder 6 and the wafer boat 7 are rotated by the motor 9, and at the same time, process gases such as a silane ($SiH_4$) gas and a phosphine ($PH_3$) gas are supplied into the processing vessel 1 through the gas supply pipe 13. The supplied process gases rise in the processing vessel 1 and are supplied to the wafers w from the upper direction of the wafers W.

The processing vessel 1 in the low-pressure CVD processing is evacuated from the gas exhaust tube 31, and the pressure in the processing vessel 1 is controlled by an exhaust control apparatus (not shown) to fall within a range of 0.1 to 0.5 Torr, e.g., to be 0.5 Torr, thereby performing low-pressure CVD processing for a predetermined period of time.

Upon completion of the low-pressure CVD processing, the gas in the processing vessel 1 is substituted with a purge gas, e.g., an N2 gas, to prepare low-pressure CVD processing for next wafers, and the pressure in the processing vessel 1 is increased to an atmospheric pressure. Thereafter, a wafer boat 7 is moved downward with a moving mechanism, and the wafer boat 7 and processed wafers 13 are unloaded from the processing vessel 1.

The processed wafers W on the wafer boat 7 unloaded from the processing vessel 1 are replaced with wafers to be processed, the wafer boat 7 is loaded into the processing vessel 1 again as described above, and low-pressure CVD processing is to be performed.

The above operation is a series of steps of low-pressure CVD processing when no leakage occurs. In the exhaust performed for a predetermined period of time by the first sub-exhaust pipe 34 prior to the above low-pressure CVD processing (see A in FIG. 2), when an oxygen gas concentration is not decreased to a predetermined value or less, an alarm is given to an operator by an alarm means such as a buzzer or an indicator lamp. When the operator confirms that the oxygen gas concentration is not decreased to the predetermined value or less within the predetermined period of time, the operator interrupts the exhaust and stops the execution of the subsequent steps as needed.

That is, in this case, an oxygen gas leaks into the processing vessel 1. For this reason, the exhaust is interrupted to confirm the states of the processing vessel 1, and the subsequent operations are stopped as needed to prevent formation of spontaneous oxide films on the wafers W. After the processing vessel 1 is purged with a nitrogen gas again, a leakage portion is repaired.

As described above, according to this embodiment, the first sub-exhaust pipe 34 is connected to the processing vessel 1, and the oxygen gas concentration in the processing vessel 1 is detected while the processing vessel 1 is evacuated by using the first sub-exhaust pipe 34 with a low exhaust pressure. For this reason, when leakage has occurred, it can be reliably detected.

When it is detected that an oxygen gas leaks into the processing vessel 1, an operator recognizes the leakage by the alarm means such as a buzzer or an indicator lamp. Therefore, the subsequent steps can be interrupted as needed, and low-pressure CVD processing is not performed while spontaneous oxide films are kept formed on the surfaces of the wafers W, thereby increasing a production yield.

Figure 4:
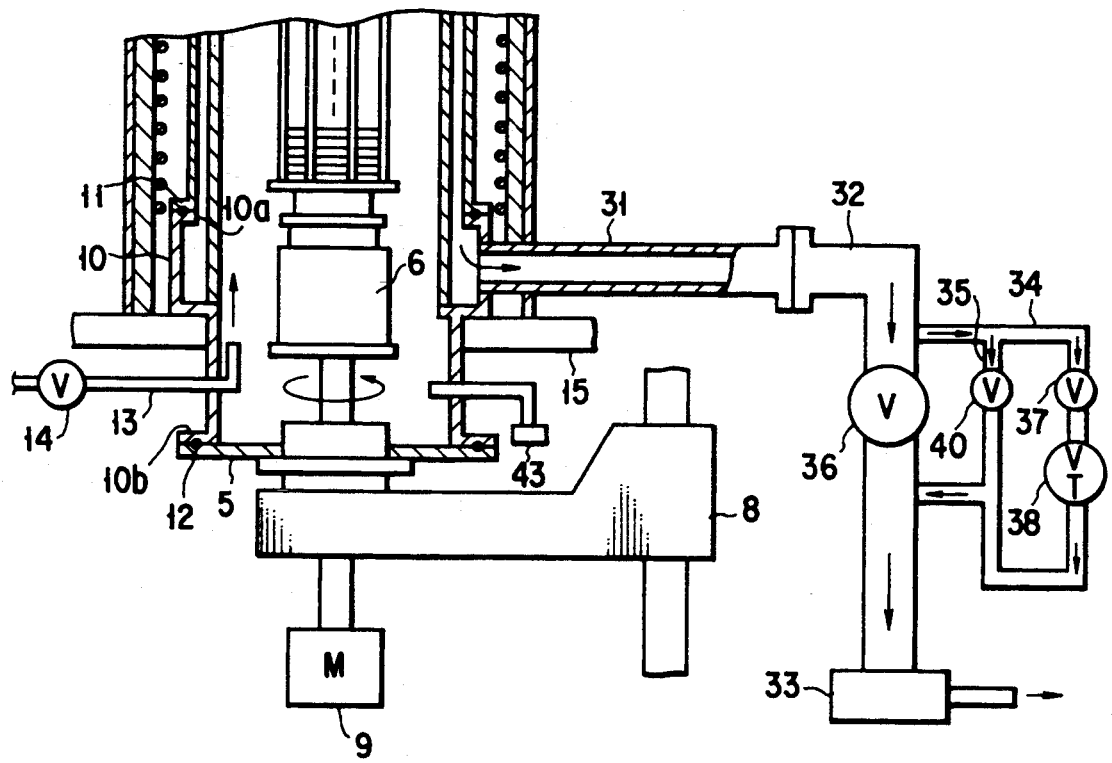

Other embodiments of the present invention will be described below with reference to FIGS. 3 to 7. In the embodiment shown in FIG. 3, a mass spectrometer 42 is arranged in place of an oxygen gas concentration sensor, and the mass spectrometer 42 measures an oxygen gas partial pressure. In this case, when not only an oxygen gas but other gases leak into a processing vessel 1, they can be reliably detected whether leakage is present or absent. As shown in FIG. 4, a pressure sensor 43, e.g., "Baratron" (tradename available from MKS, U.S.A.) is arranged in the processing vessel 1, and the state of a reduced pressure in the processing vessel 1 is monitored to detect whether leakage is present or absent. However, a detection accuracy using the pressure sensor 43 is lower than that using an oxygen gas concentration sensor or a mass spectrometer.

Figure 5:
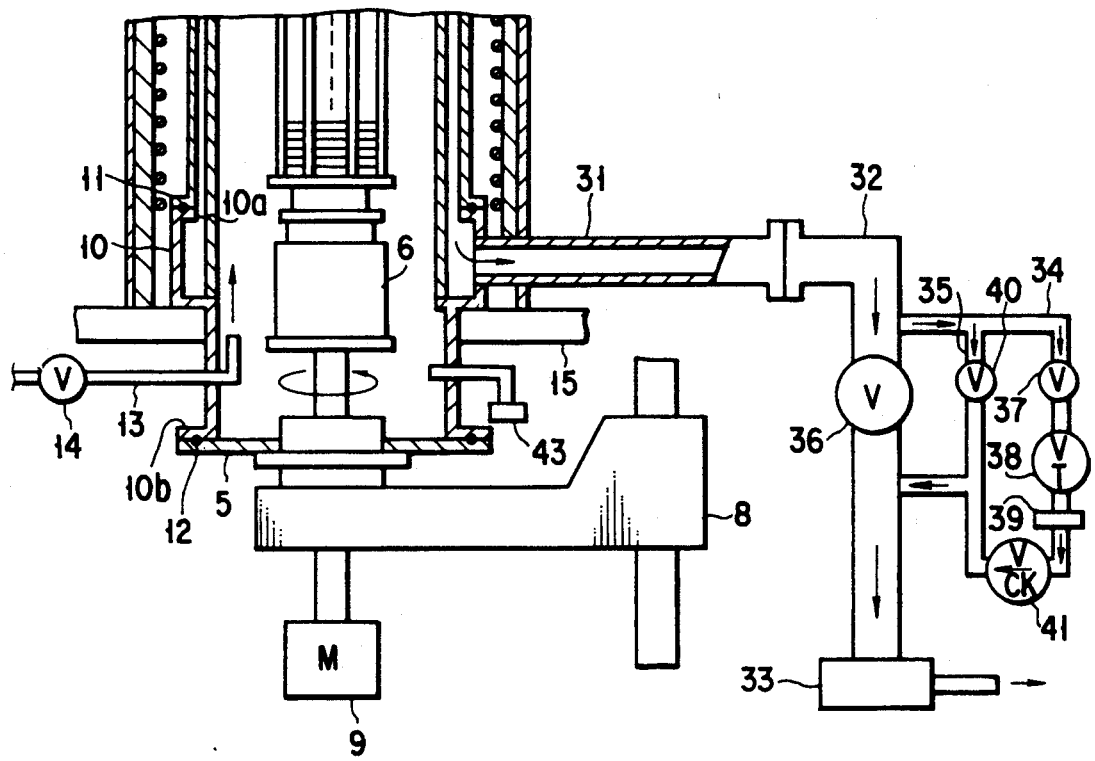

In the embodiment shown in FIG. 5, a pressure sensor 43 for detecting a pressure in the processing vessel 1 is added to the apparatus in FIG. 1. When exhaust is performed by using a first sub-exhaust pipe 34, not only the oxygen concentration of a gas in the processing vessel 1 but the pressure in the processing vessel 1 can be detected.

In this embodiment, a mass spectrometer may be used in place of an oxygen gas concentration sensor to measure an oxygen gas partial pressure.

Figure 6:
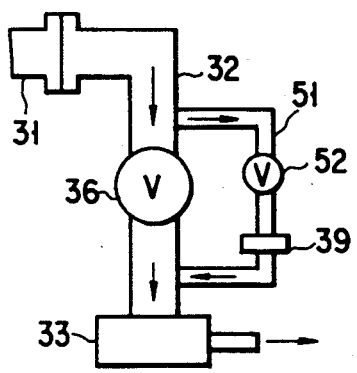

In the embodiment shown in FIG. 6, one sub-exhaust pipe 51 having a sub-valve 52 is connected parallelly to a main exhaust pipe 32 having a main valve 36, and an oxygen gas concentration sensor 39 is arranged in the sub-exhaust pipe 51.

In this case, reduced pressure processing is performed as follows.

A processing vessel 1 purged with a purge gas is evacuated by using the sub-exhaust pipe 51 with a low exhaust pressure. During this exhaust, the oxygen gas concentration of a gas from the processing vessel 1 is detected by the oxygen gas concentration sensor 39.

When the exhaust is continued, and the oxygen gas concentration is decreased to a predetermined value or less within a predetermined period of time, the main valve 36 is opened, and the processing vessel 1 is evacuated by using the main exhaust pipe 32 with an exhaust pressure higher than that of the sub-exhaust pipe 51.

Thereafter, low-pressure CVD processing is started as described above.

In the exhaust performed by using the sub-exhaust pipe 51, when the oxygen gas concentration is not decreased to the predetermined value or less within a predetermined period of time, an operator recognizes it by an alarm means such as a buzzer or an indicator lamp. When the operator recognizes it, the operator stops the exhaust, purges the processing vessel 1 with a nitrogen gas, and stops the subsequent steps.

Figure 7:
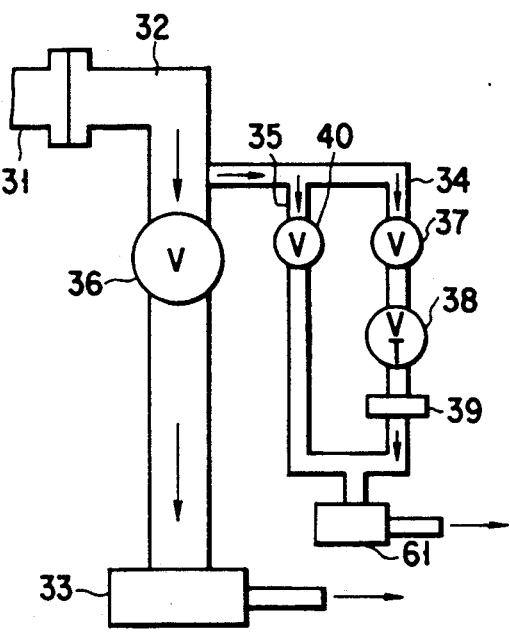

In each of the above embodiments, only one vacuum pump is arranged, and the exhaust using the main exhaust system and the exhaust using the sub-exhaust system are performed by the same vacuum pump. However, as shown in FIG. 7, by arranging a vacuum pump 61 in the sub-exhaust system, the exhaust using the main exhaust system and the exhaust using the sub-exhaust system can be performed by the different vacuum pumps, respectively. The positions in which exhaust paths or pipes are arranged are not limited to the above embodiments.

The reduced processing apparatus can be applied to not only a case wherein a plurality of objects are processed but a case wherein each object is processed at a time.

Since an oxygen gas concentration sensor has a measurement value changed depending on a pressure, it is preferable that a measured oxygen concentration is automatically calibrated on the basis of calibration data of each pressure. In addition, a means for detecting an oxygen gas concentration or oxygen gas partial pressure in the processing vessel is not limited to the above oxygen gas concentration sensor and a mass spectrometer. A position where the means is arranged is not limited to a sub-exhaust pipe. It may be arranged in the processing vessel.

As has been described above, although a case wherein the present invention is applied to low-pressure CVD processing has been described, the present invention is not limited to the above description. The present invention can be applied to various types of processing such as vacuum evaporation, sputtering, epitaxial growth, and doping.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A reduced pressure processing apparatus comprising:
   a processing vessel for processing an object to be processed in a reduced pressure atmosphere;
   exhaust means, including a main exhaust system having a relatively high exhaust pressure and a sub-exhaust system for performing an initial slow exhaust, said sub-exhaust system having a relatively low exhaust pressure, relative to said high exhaust pressure of said main exhaust system for evacuating said processing vessel; and
   detection means for detecting an oxygen gas concentration or an oxygen gas partial pressure to detect leakage within said processing vessel during exhaust performed by said sub-exhaust system.

2. An apparatus according to claim 1, wherein said detection means has an oxygen gas concentration sensor.

3. An apparatus according to claim 1, wherein said detection means has a mass spectrometer.

4. An apparatus according to claim 1, further comprising pressure detection means for detecting a pressure in said processing vessel.

5. An apparatus according to claim 1, further comprising gas feed means, arranged in said processing vessel, for feeding a process gas for performing predetermined processing to said object.

6. An apparatus according to claim 5, further comprising purge means for gas-purging said processing vessel.

7. An apparatus according to claim 5, wherein a CVD film is formed on a surface of said object by the process gas.

8. An apparatus according to claim 1, wherein said object is a semiconductor wafer.

9. An apparatus according to claim 1, wherein said main exhaust system has a main exhaust path communicating with said processing vessel, a main valve, arranged in said main exhaust path, for opening/closing said main exhaust path, and a vacuum pump for evacuating said processing vessel.

10. An apparatus according to claim 1, wherein said sub-exhaust system has first and second sub-exhaust paths parallelly connected to said main exhaust path; first and second sub-valves, respectively arranged in said first and second sub-exhaust paths, for opening/closing said first and second sub-exhaust paths; a needle valve, arranged in said first sub-exhaust path, for adjusting an exhaust amount; and a vacuum pump for evacuating said processing vessel through said first and second sub-exhaust paths, and said detection means is arranged in said first sub-exhaust path.

11. An apparatus according to claim 1, wherein said sub-exhaust system has a sub-exhaust path parallelly connected to said main exhaust path; a sub-valve, arranged in said sub-exhaust path, for opening/closing said sub-exhaust path; and a vacuum pump for evacuating said processing vessel through said sub-exhaust path, and said detection means is arranged in said sub-exhaust path.

12. The apparatus of claim 10, wherein said sub-exhaust paths each have an upstream end in communication with said main exhaust system at a first location, said sub-exhaust paths each having a downstream end in communication with said main exhaust system at a second location such that said sub-exhaust system forms a by-pass connected in said main exhaust system.

13. The apparatus of claim 12, wherein said main exhaust system includes a valve disposed between said first and second locations.

14. The apparatus of claim 11, wherein said sub-exhaust path includes an upstream end in communication with said main exhaust system at a first location, said sub-exhaust path further including a downstream end in communication with said main exhaust system at a second location such that said sub-exhaust system forms a by-pass connected to said main exhaust system.

15. The apparatus of claim 14, wherein said main exhaust system includes a valve disposed between said first and second locations.

* * * * *